(12) United States Patent
Kusic (10) Patent No.: US 7,438,260 B2
(45) Date of Patent: Oct. 21, 2008

(54) VERTICAL TAKE-OFF AIRCRAFT—C

(76) Inventor: Tom Kusic, P.O. Box 932, Melbourne, Vic (AU) 3001

( * ) Notice: Subject to any disclaimer, the term of this patent is extended or adjusted under 35 U.S.C. 154(b) by 419 days.

(21) Appl. No.: 10/996,416

(22) Filed: Nov. 26, 2004

(65) Prior Publication Data
US 2005/0269440 A1 Dec. 8, 2005

Related U.S. Application Data

(63) Continuation-in-part of application No. 09/180,925, filed on Nov. 16, 1998, now abandoned.

(51) Int. Cl.
*B64C 27/52* (2006.01)
(52) U.S. Cl. .................. 244/17.17; 244/17.11
(58) Field of Classification Search ............ 244/17.17, 244/17.11, 7 R, 7 A, 6, 4 A, 17.19, 8, 17.21
See application file for complete search history.

(56) References Cited

U.S. PATENT DOCUMENTS

| | | | | |
|---|---|---|---|---|
| 2,378,617 A | * | 6/1945 | Burke | .......................... 416/121 |
| 2,569,882 A | | 10/1951 | De Bothezat | |
| 2,589,030 A | | 3/1952 | Alde | |
| 2,677,431 A | * | 5/1954 | Prince | .......................... 416/148 |
| 2,724,446 A | | 11/1955 | Hill | |
| 2,818,122 A | | 12/1957 | Johnston | |
| 2,861,641 A | | 11/1958 | Bensen | |
| 3,100,610 A | | 8/1963 | Armstrong | |
| 3,135,481 A | * | 6/1964 | Sudrow | .................... 244/23 C |
| 3,428,271 A | | 2/1969 | Hollrock et al. | |
| 3,474,987 A | | 10/1969 | Meditz | |
| 3,554,467 A | | 1/1971 | Yowell | |
| 3,921,939 A | | 11/1975 | Garfinkle | |
| 4,720,059 A | | 1/1988 | Stearns | |

FOREIGN PATENT DOCUMENTS

DE 19540272 A1 4/1997

* cited by examiner

*Primary Examiner*—Tien Dinh (57) ABSTRACT

A vertical take-off aircraft is disclosed. Looking at the aircraft it can be seen that the aircraft consists of a main rotor assembly 1 at the top of the aircraft which consists of an assembly of blades 2, 3 and a rotor 4. Rotation of the main rotor assembly 1 is achieved by using an engine assembly 5. The main engine assembly is connected to the main body 6 of the aircraft by a tilt enabling joint 7. The tilt enabling joint 7 allows tilting of the main engine 5 relative to the main body 6 of the aircraft to occur in a controlled manner during flight. A universal joint 8 is used to allow tilting to occur. The tilt enabling joint 7 is fitted with a combination of hydraulic actuators 9, 10 and springs 11, 12 and 13 that allow the tilting of the tilt enabling joint 7 to be controlled. When the main engine 5 is tilted, the main rotor assembly 1 is tilted with it. Tilting of the main engine assembly 5 thus initiates changes in the direction of travel of the aircraft without the need to change the pitch angles of the blades 2 and 3. To counter the rotational force exerted on the main body 6 of the aircraft by the rotation of the main rotor assembly 1, an additional engine assembly 15 is attached to the main body aircraft, which rotates a secondary rotor assembly 16. The secondary rotor assembly consists of blades 17 and 18, and a rotor 19. Rotation of the secondary rotor assembly pushes air in a primarliy horizontal direction by way of the pitch of the blades 17 and 18.

4 Claims, 14 Drawing Sheets

VERTICAL TAKE-OFF AIRCRAFT—C

CROSS REFERENCE TO RELATED APPLICATIONS

This patent application is a continuation-in-part of the U.S. patent application Ser. No. 09/180,925 filed Nov. 16, 1998 now abandoned.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

This invention relates to the vertical take-off field of aviation.

2. Brief Summary of the Invention

There are many helicopters and gyrocopters in existence today. However, helicopters rely on variable pitch rotor blades to maintain control and provide vertical lift, while aircraft commonly referred to as gyrocopters are pushed in a forward direction on take-off due to the backward thrust of air caused by the propeller located to the rear of the engine assembly.

The present invention overcomes the need for varying the pitch of rotor blades while at the same time allowing vertical lift on take-off and directional control by providing a vertical take-off aircraft using an main rotor assembly at the top of the aircraft, which main rotor assembly consists of an assembly of blades and a rotor.

Vertical lift is obtained by the rotation of the main rotor assembly thereby forcing air in a downward direction by way of the angle of pitch of the blades. Rotation of the main rotor assembly is achieved using an engine assembly located between the main body of the aircraft and the main rotor assembly, which engine assembly is the main engine assembly forming part of the aircraft, and which main engine assembly is connected to the main body of the aircraft by a tilt enabling joint. The main engine assembly is rigidly attached to the tilt enabling joint such that the main rotor assembly is able to be rotated relative to the main engine assembly. The tilt enabling joint comprises numerous components, some of which provide the means to support the main body of the aircraft below the main engine assembly and allow the tilt enabling joint to have a tilting ability while other components provide the means to control and cause tilting motions in the tilt enabling joint during flight, thereby enabling controlled tilting to occur, such that the main engine assembly and the main rotor assembly can be tilted together as a unity relative to the main body of the aircraft in a controlled manner during flight, thereby providing a means for controlling the directional travel of the aircraft during flight and changing the aircraft's direction of travel.

During flight, rotational stability of the main body of the aircraft is maintained by means of an additional engine assembly attached to the aircraft which rotates a secondary rotor assembly, thereby pushing air primarily in a horizontal direction to counter the rotational force exerted on the main body of the aircraft by the rotation of the upper main rotor assembly, which said secondary rotor assembly consists of an assembly of blades and a rotor.

BRIEF DESCRIPTION OF THE SEVERAL VIEWS OF THE DRAWINGS

Embodiments of the invention will now be described by way of example with reference to the accompanying drawings, of which.

DETAILED DESCRIPTION OF THE DRAWINGS

Figure 1:
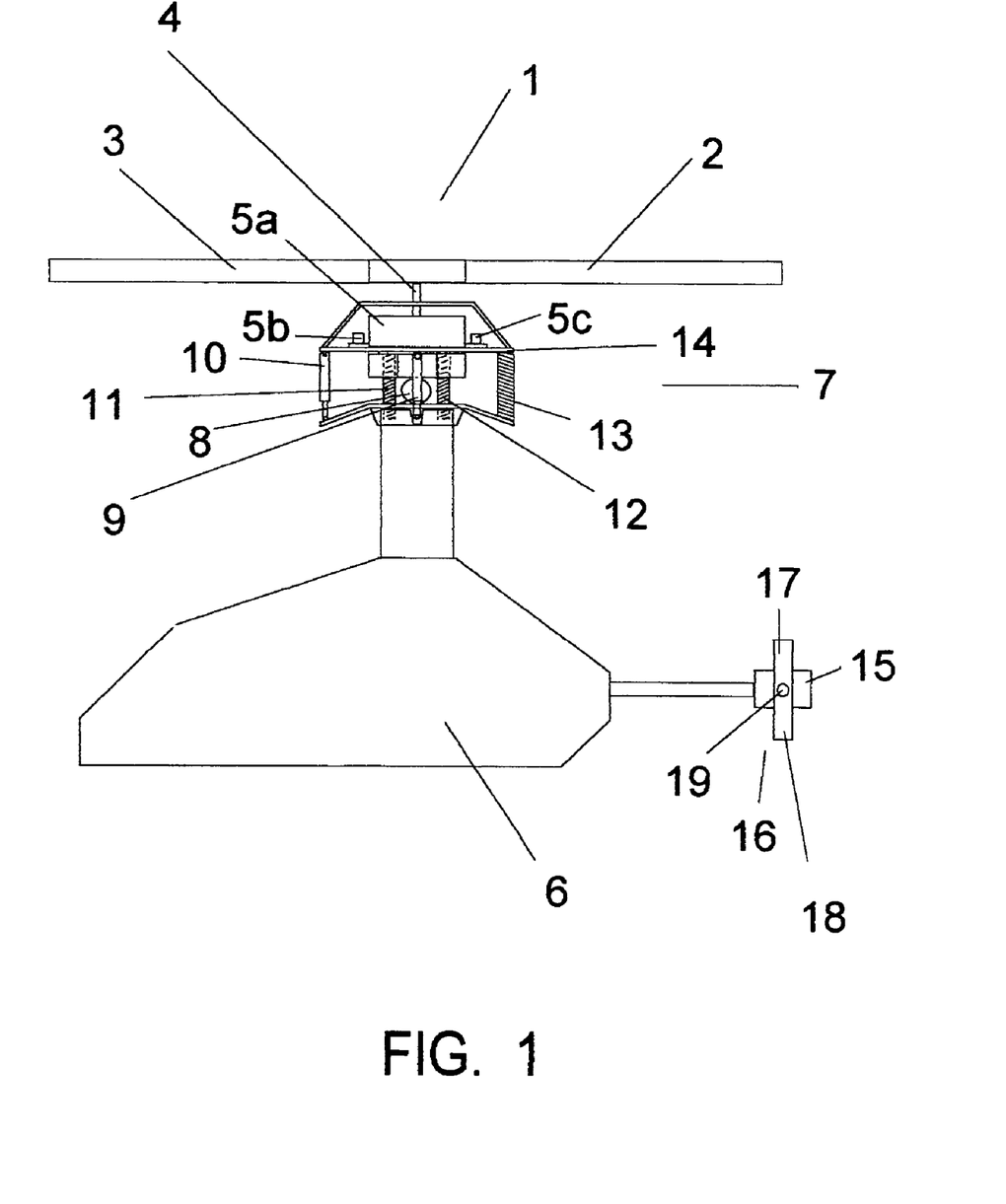
FIG. 1 is a view of the left side of one form of aircraft according to this invention.

FIG. 1 shows one form of aircraft according to this invention.

Looking at the aircraft in FIG. 1 it can be seen that the aircraft comprises a main rotor assembly 1 at the top of the aircraft, which rotor assembly consists of an assembly of blades 2, 3 and a rotor 4. Rotation of the main rotor assembly is achieved by using an engine assembly 5a, which is the main engine assembly on the aircraft. Vertical lift is obtained by the rotation of the main rotor assembly 1 relative to the main engine assembly 5a. Rotation of the main rotor assembly 1 forces air in a downward direction by way of the angle of pitch of the blades 2 and 3. The main engine assembly is connected to the main body 6 of the aircraft by a tilt enabling joint 7, with the main engine assembly rigidly attached to the tilt enabling joint by bolts 5b and 5c. The tilt enabling joint 7 allows tilting of the main engine assembly 5a relative to the main body 6 of the aircraft to occur in a controlled manner. A universal joint 8 is used to allow tilting to occur. The tilt enabling joint 7 is fitted with a combination of hydraulic actuators 9, 10 and springs 11, 12 and 13 that allow the tilting of the tilt enabling joint 7 to be controlled. As hydraulic pressure is applied to the front hydraulic actuator 10, it expands and in so doing tilts the upper section 14 of the tilt enabling joint 7 rearward, thereby compressing the rear spring 13. As hydraulic pressure to the front hydraulic actuator 10 is released, the rear spring 13 acts to tilt the upper section 14 of the tilt enabling joint 7 forward. When the main engine assembly 5a is tilted, the main rotor assembly 1 is tilted with it. Tilting of the main engine assembly 5a thus initiates changes in the direction of travel of the aircraft without the need to change the pitch angles of the blades 2 and 3. To counter the rotational force exerted on the main body 6 of the aircraft by the rotation of the main rotor assembly 1, FIG. 1 shows an additional engine assembly 15 attached to the main body of the aircraft, which rotates a secondary rotor assembly 16. The secondary rotor assembly consists of blades 17 and 18, and a rotor 19. Rotation of the secondary rotor assembly pushes air in a primarliy horizontal direction by way of the pitch of the blades 17 and 18. By forcing air to travel in a horizontal direction, the secondary rotor assembly acts to counter the rotational force exerted on the main body 6 of the aircraft by the rotation of the main rotor assembly 1.

The Springs 11, 12 and 13 shown in FIG. 1 can be replaced with gas pressurised struts, with the struts fitted in the locations where the springs are located in FIG. 1.

Figure 2A:
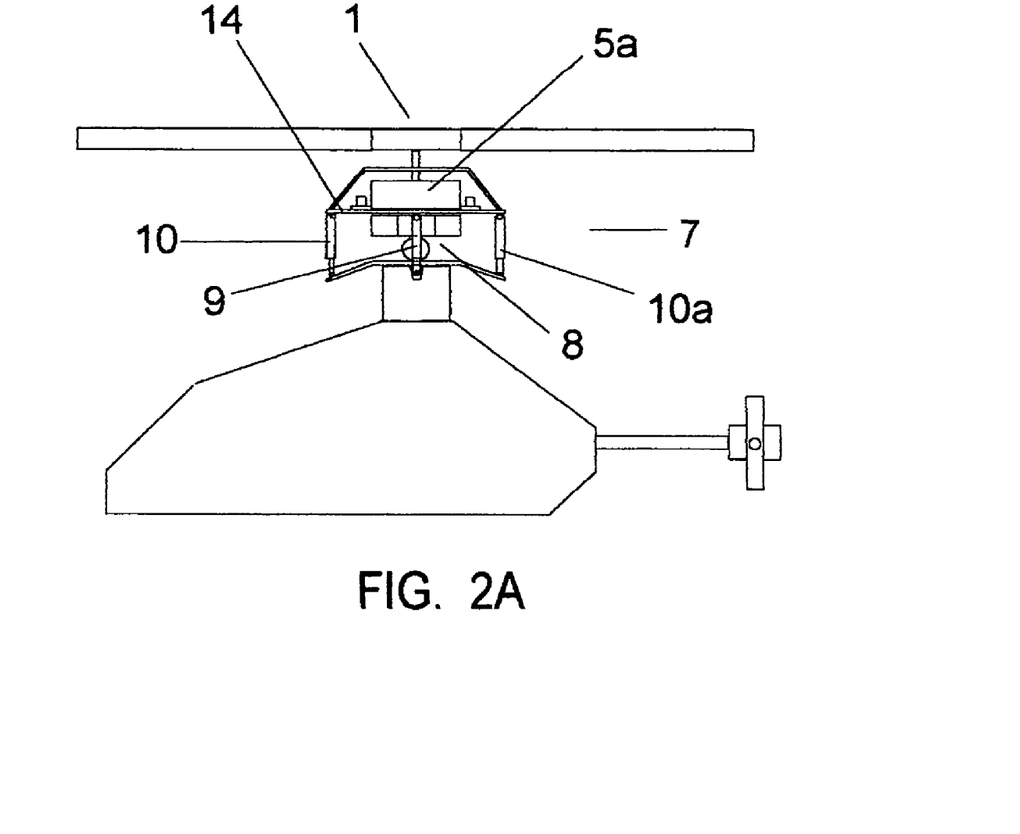
FIG. 2A is a view of the left side of another form of aircraft according to this invention.
Figure 2B:
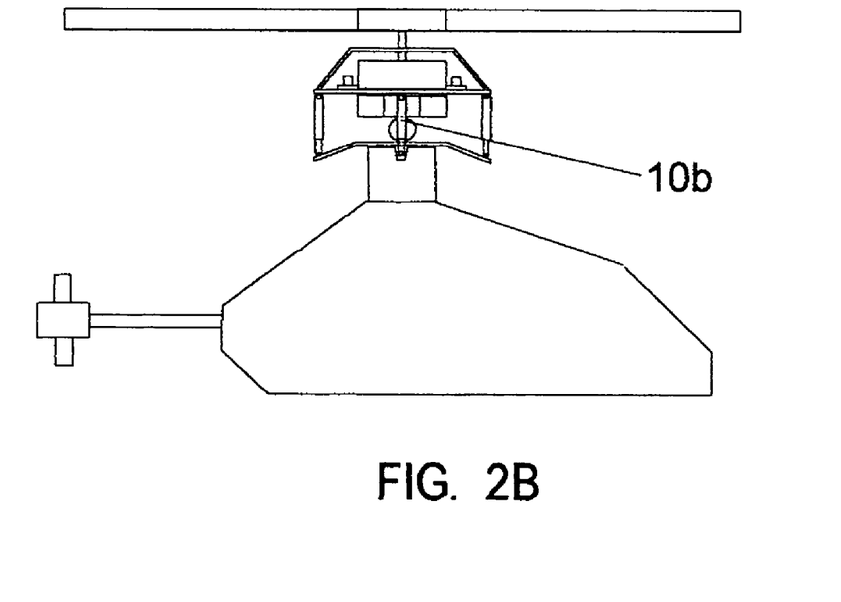
FIG. 2B is a view of the right side of the aircraft of FIG. 2A.

FIG. 2A shows a tilt enabling joint 1 consisting of hydraulic actuators 9, 10 and 10a being used to control the direction and angle of tilt, and a universal joint 8. As hydraulic pressure is applied extend to one hydraulic actuator 10 to extend it, hydraulic pressure on the hydraulic actuator 10a located directly on the opposite side of the universal joint 8 is released, allowing that hydraulic actuator 10a to contract, thereby causing controlled tilting of the upper section of the tilt enabling joint. The movement can be reversed by applying hydraulic pressure to hydraulic actuator 10a and releasing hydraulic pressure on hydraulic actuator 9. With the main engine assembly 5a attached to the upper section 14 of the tilt enabling joint, when the upper section 14 of the tilt enabling joint is tilted so too is the main engine assembly 5a and with it the main rotor assembly 1. FIG. 2B shows the aircraft of FIG. 2A rotated horizontaly 180 degrees to show the hydraulic actuator 10b on right side of the tilt enabling joint.

Figure 3:
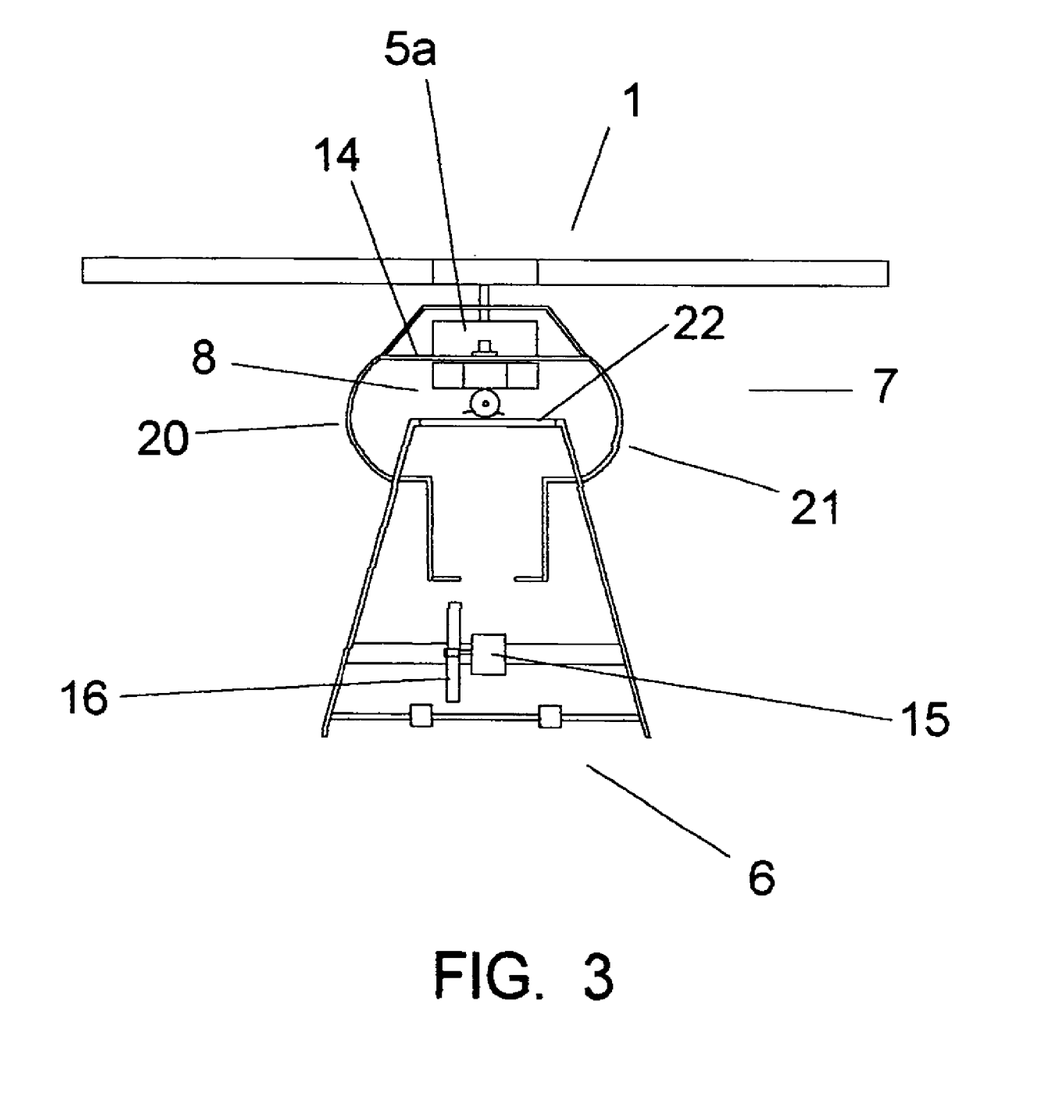
FIG. 3 is a view of the rear of yet another form of aircraft according to this invention.

FIG. 3 shows the rear view of another form of the aircraft with handles 20 and 21 forming part of the tilt enabling joint 7. The handles 20 and 21 are attached to the upper section 14 of the tilt enabling joint. The tilting ability of the tilt enabling joint is achieved by the universal joint 8. The aircraft has a main rotor assembly 1 which is rotated by a main engine assembly 5a. An additional engine assembly 15 is used to rotate the secondary rotor assembly 16. Directional control of the aircraft during flight is achieved by controlled tilting of the upper section 14 of the tilt enabling joint relative to the lower section 22 of the tilt enabling joint, thereby tilting the main engine assembly 5a and main rotor assembly 1. Controlled tilting of the upper section 14 of the tilt enabling joint during flight is enabled by the handles 20 and 21. Moving the handles 20 and 21 relative to the main body of the aircraft 6 would be capable of causing a forward and rearward tilting to the upper section of the tilt enabling joint, as well as sideway tilting.

Figure 4:
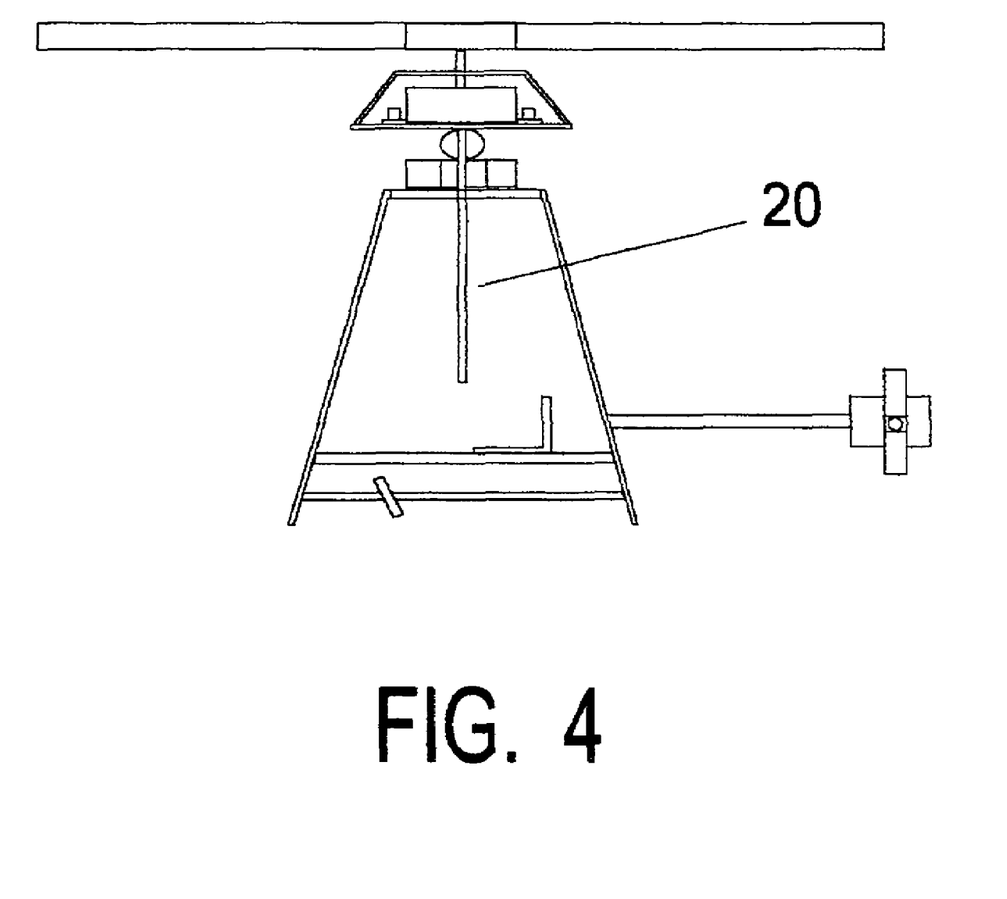
FIG. 4 is the left side view of the aircraft of FIG. 3.

FIG. 4 is the left side view of FIG. 3, showing the position of the left handle 20 from a side view.

Figure 5A:
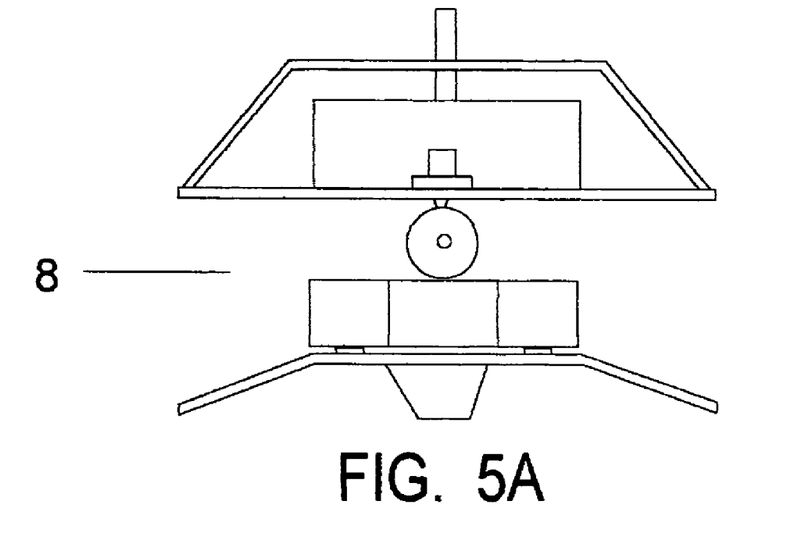
FIG. 5A is an enlarged view of a universal joint.
Figure 5B:
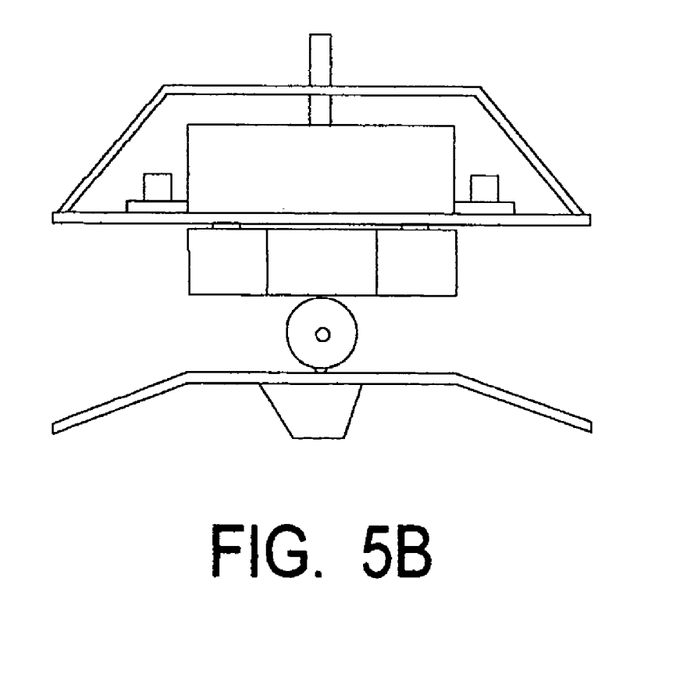
FIG. 5B is a rotated view of the universal joint of FIG. 5A.

FIGS. 5A and 5B shows the universal joint 8 of the tilt enabling joint of FIG. 1. FIG. 5B is FIG. 5A rotated 90 degrees horizontally.

Figure 6:
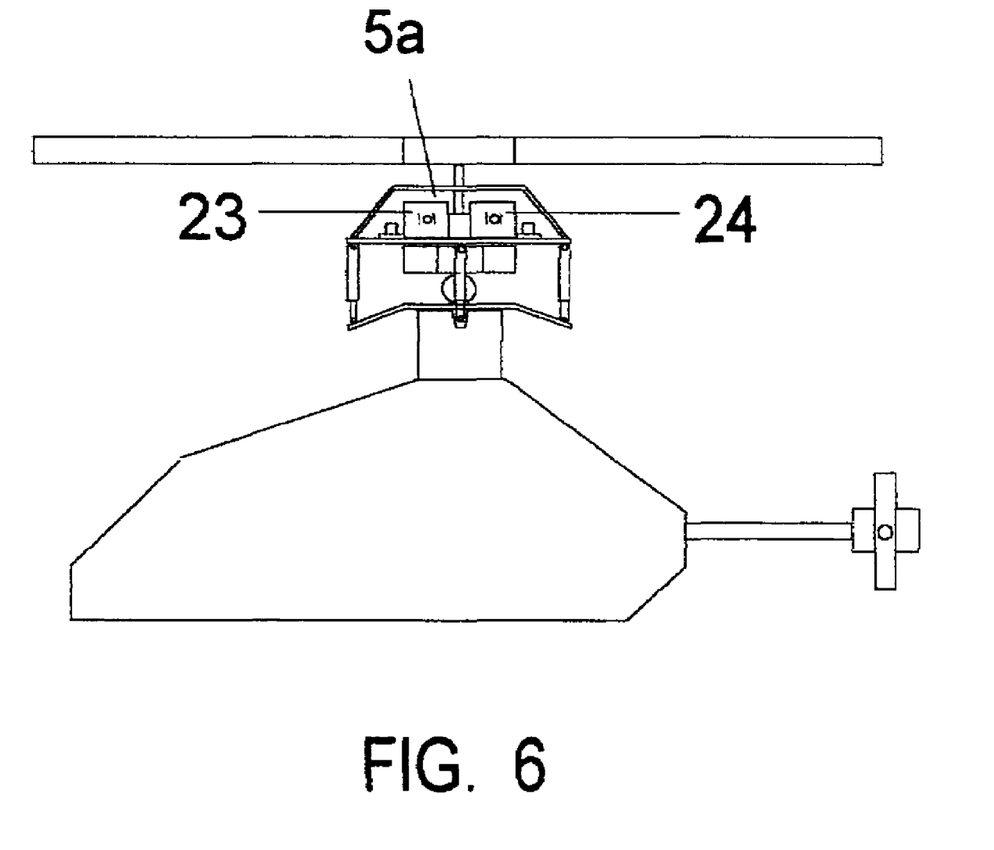
FIG. 6 shows the main engine assembly comprising two engines.

FIG. 6 shows a version of the aircraft with the main engine assembly 5 comprising two engines 23 and 24. The main engine assembly in FIG. 1 comprised a single engine.

Figure 7:
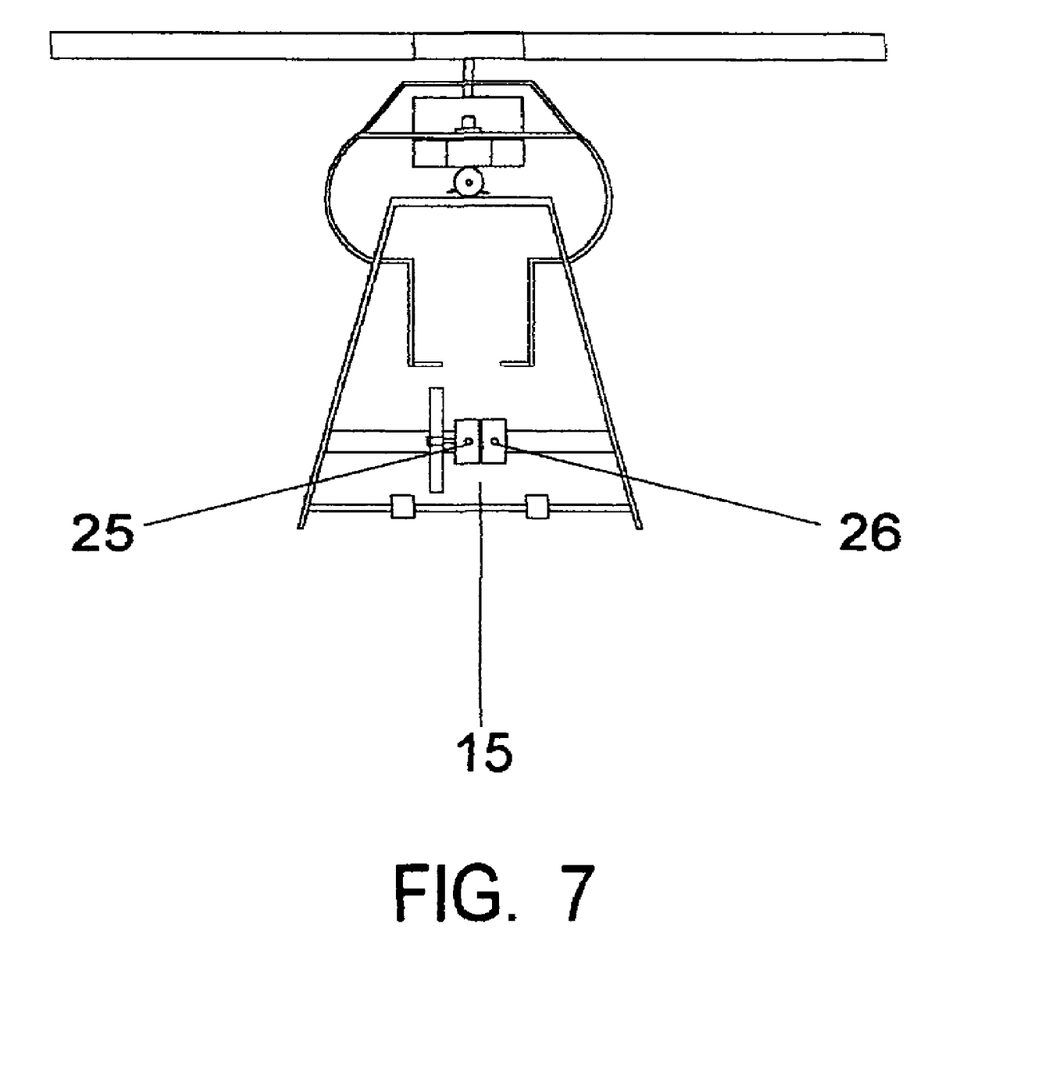
FIG. 7 shows the additional engine assembly comprising two engines.

FIG. 7 shows the rear of a version of the aircraft of FIG. 3 with additional engine assembly 15 comprising two engines 25 and 26. The additional engine assembly of the aircraft in FIG. 3 comprised a single engine.

Figure 8:
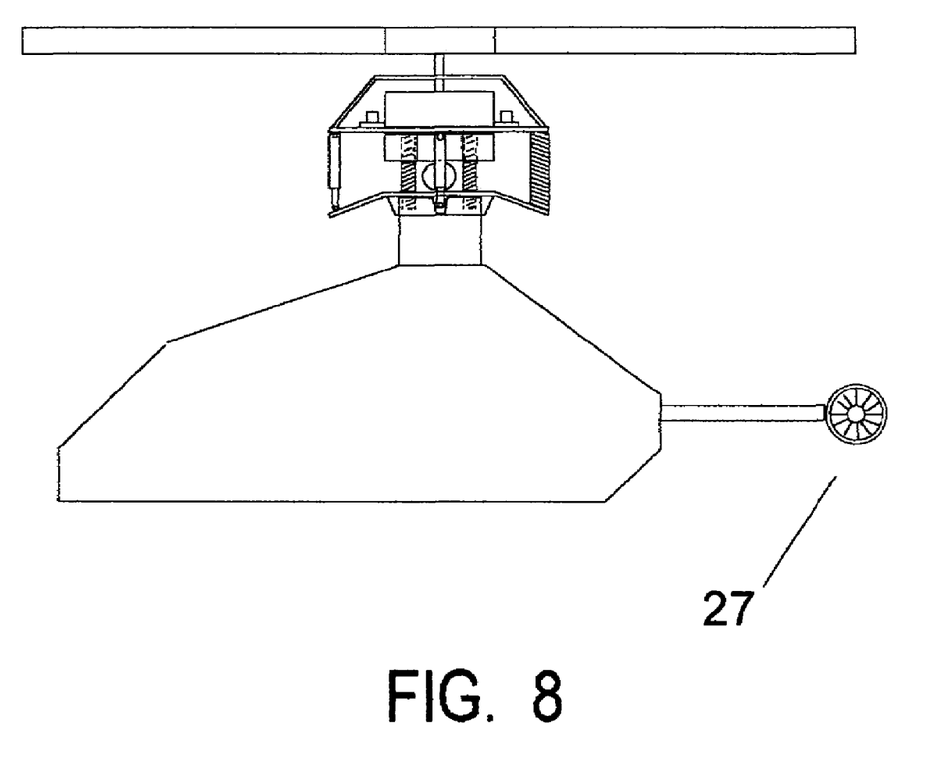
FIG. 8 shows one form of the aircraft with the additional engine assembly and secondary rotor assembly replaced by a jet engine.

FIG. 8 shows a version of the aircraft of FIG. 1 with a jet engine 27 replacing the additional engine assembly 15 shown in FIG. 1 and the secondary rotor assembly 16 also shown in FIG. 1. The jet engine is shown connected to the main body of the aircraft. In another form of the aircraft the jet engine is connected to the upper section of the tilt enabling joint. It could also be connected to the main engine assembly. The jet engine shown is a turbojet. In another form of the aircraft, the jet engine is a turbofan.

Figure 9:
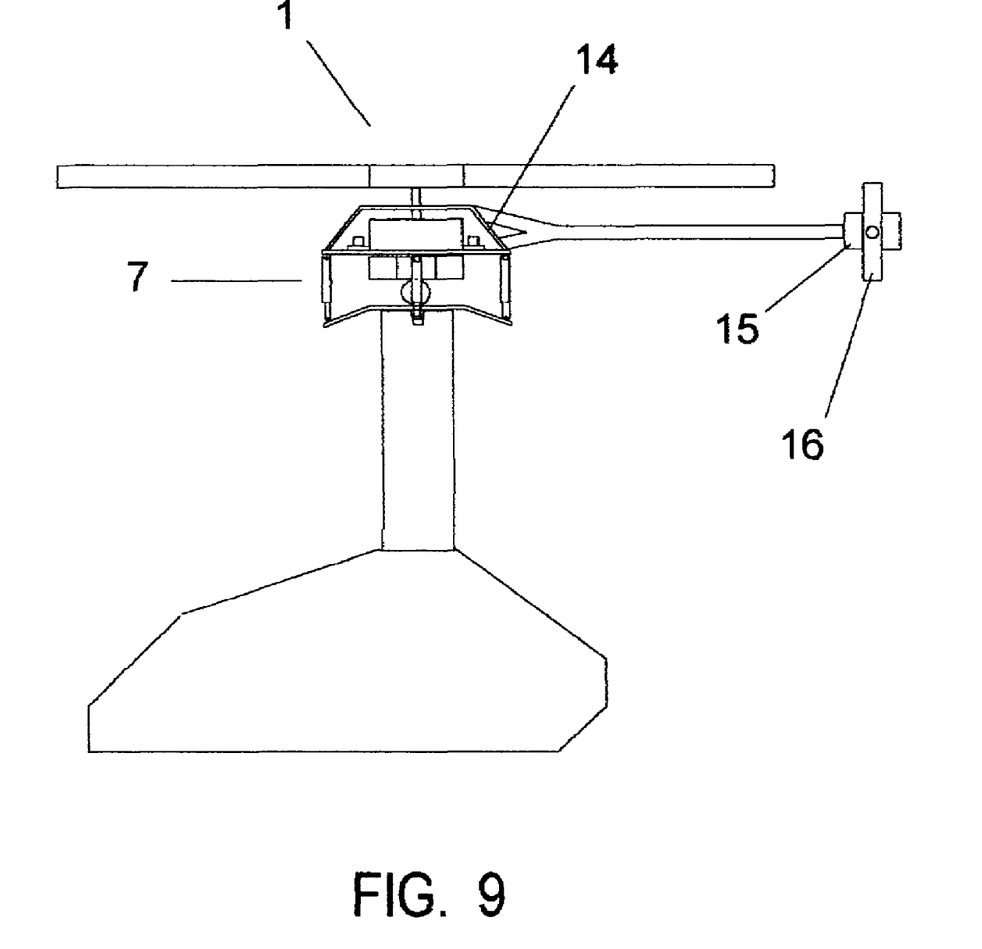
FIG. 9 shows one form of the aircraft with the additional engine assembly and secondary rotor assembly connected to the upper section of a tilt enabling joint.

FIG. 9 shows a version of the aircraft where the additional engine assembly 15 is attached to the upper section 14 of the tilt enabling joint 7, with the secondary rotor assembly 16 attached to the additional engine assembly 15. This feature would allow both the main rotor assembly 1 and the secondary rotor assembly 16 to stay high above the ground when the aircraft has landed in a forest. In another form of the aircraft, the additional engine assemly could be connected to the main engine assembly.

Figure 10:
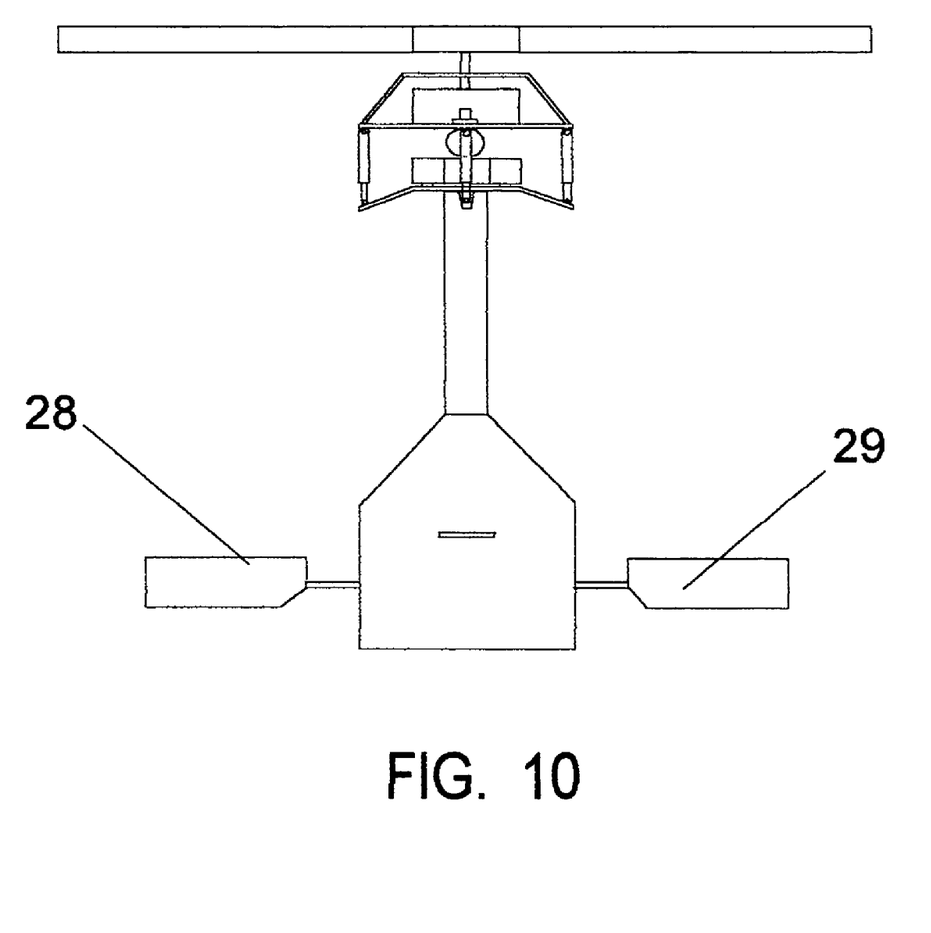
FIG. 10 shows how variable pitch fins could be positioned on the aircraft.

FIG. 10 shows the front of an aircraft similar to the one shown in of FIG. 9 and how variable pitch fins 28 and 29 could be positioned on the aircraft. The variable pitch fins could augment control of the aircraft, and could be used as airbrakes. They could also provide lift during high speed forward flight, such as wings on an airplane, since downwash from the main rotor assembly 2 would be directed to the rear of the aircraft, due to the tilting of the main rotor assembly in a forward direction and the distance of the main rotor assembly from the variable pitch fins.

Figure 11:
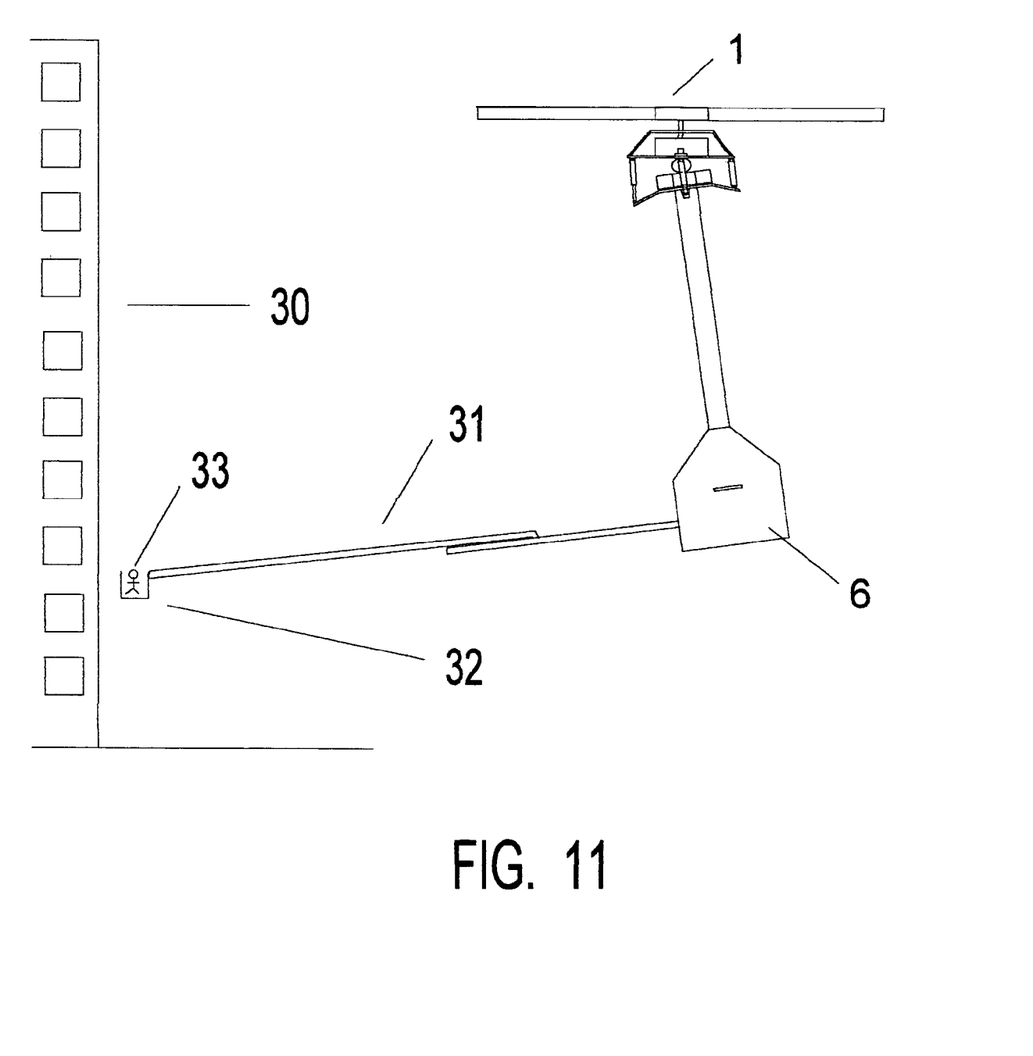
FIG. 11 shows how one form of the aircraft could be used to evacuate people from the side of a building.

FIG. 11 shows how an aircraft according to this invention could be used as an evacution vehicle for persons trapped in a building 30. An extension ladder 31 secured to the main body 6 of the aircraft is shown in extended form, with a basket 32 at the end of the extension ladder. FIG. 11 shows how a person 33 could be rescued from the building. The large distance between the main rotor and the main body of the aircraft makes the main body 6 of the aircraft act like a keel on a yaght, so that an extension ladder has a minimal effect on the ability to control the aircraft. The main body could be tilted slightly, while the main rotor assembly 1 could be maintained in a level position.

Figure 12:
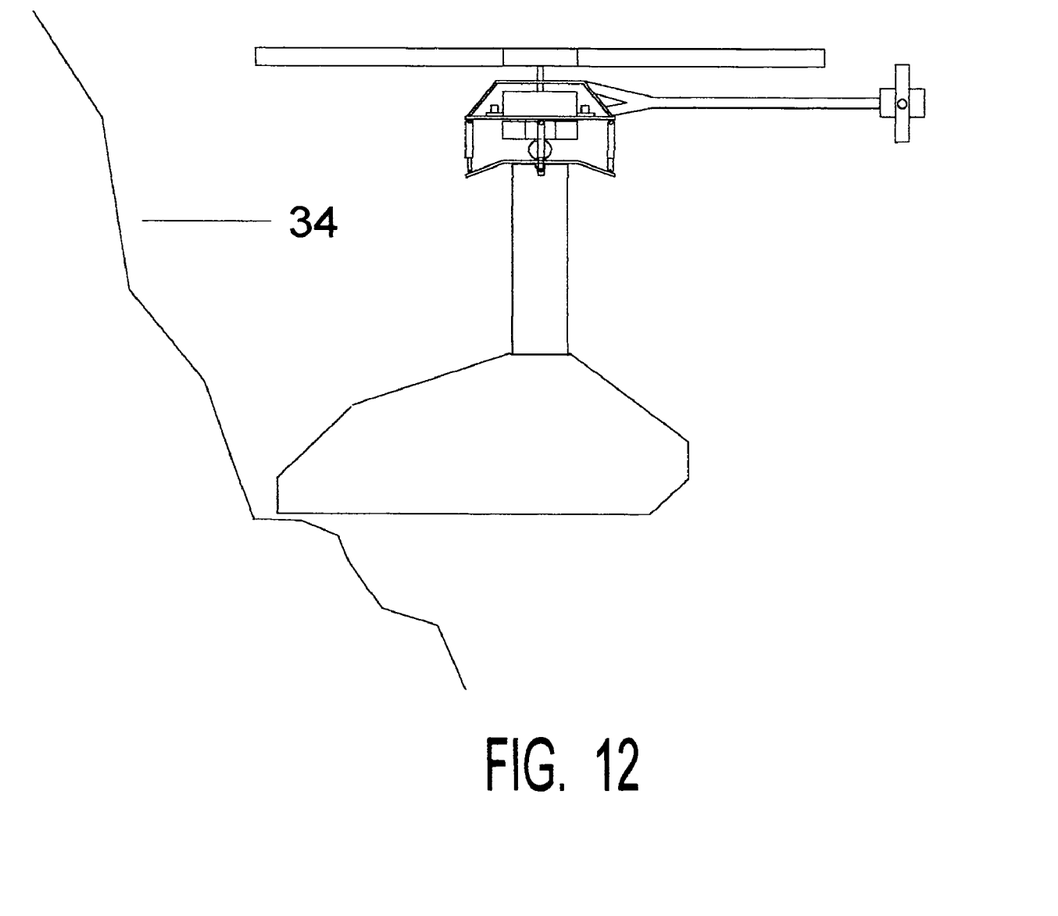
FIG. 12 shows how the main body of the aircraft of FIG. 9 could make contact with the side of steep mountain while the rotors are kept at a safe distance.

FIG. 12 shows how the aircraft of FIG. 9 could be used to quickly unload supplies on the side of a steep mountain 34, or quickly evacuate injured persons without having to use a winch. The relatively short distance between the main rotor and the main body of a conventional helicopter would prevent the main body of a conventional helicopter being able to make contact with such a steep mountain without a high risk of the rotor blades impacting with the mountain.

Figure 13:
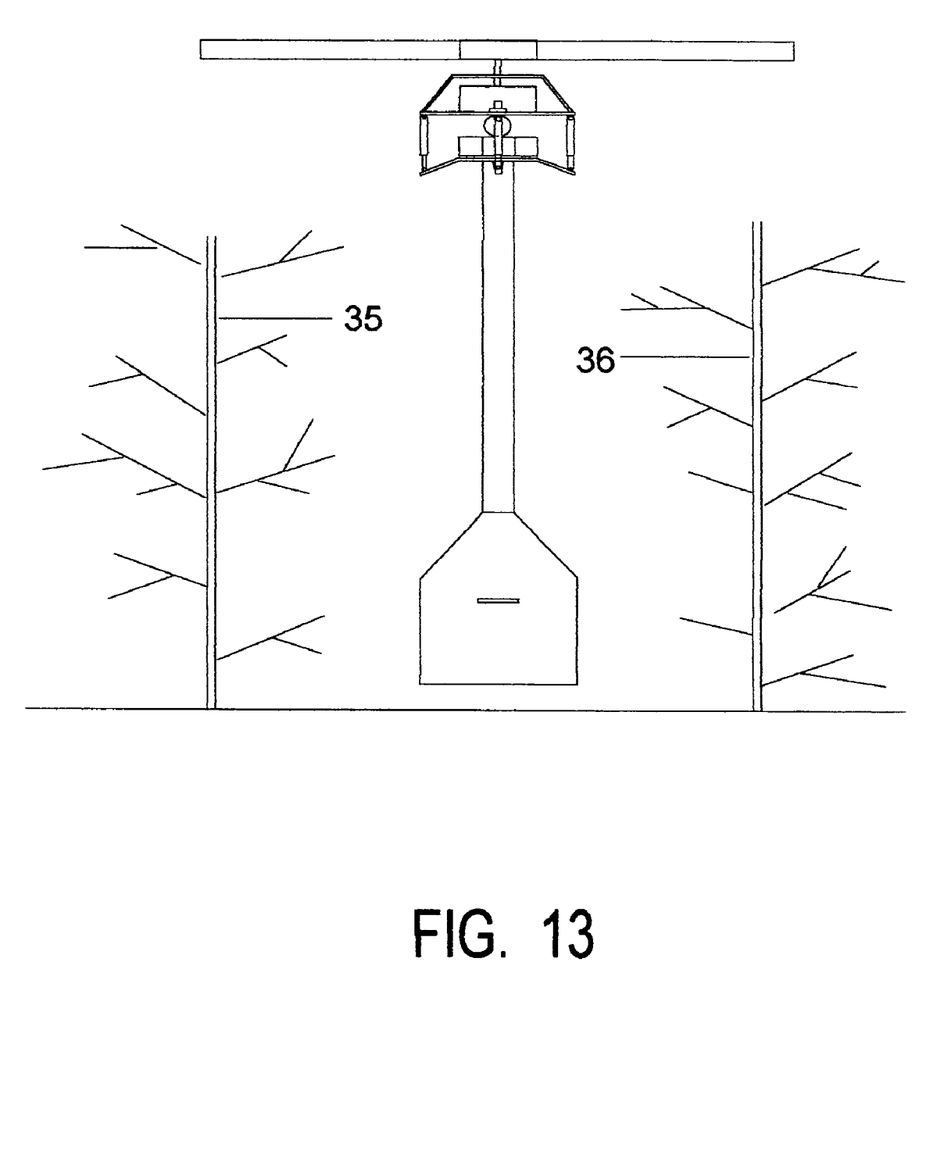
FIG. 13 shows that by keeping the main rotor at a large distance from the main body of the aircraft, the aircraft would be able to land among trees while the main rotor is kept above the trees.

FIG. 13 shows how the aircraft of FIG. 11 could land between trees 35 and 36, while the main rotor assembly is kept above the tops of the trees. Cargo could be loaded and unloaded or injured persons evacuated without using a winch.

FIG. 9 showed the aircraft with the additional engine assembly 15 and the secondary rotor assembly 16 connected to the upper section of the tilt enabling joint. By attaching the secondary rotor assembly 16 and the additional engine assembly 15 to the upper section of the tilt enabling joint, the secondary rotor assembly could be kept above trees when the aircraft is landed amongst trees as shown in FIG. 13. The aircraft could land in an area such as a forest where the rotors of a conventional helicopter would impact with the trees. The aircraft would not require a cleared landing zone to land in a forest. In a war, the possible landing area would be less predictable by an enemy force, reducing the risk of an ambush around a cleared landing zone. If the aircraft was operated on a battle field and the aircraft was targeted by a heat seaking missile during flight, having the main engine assembly 5a and the additional engine assembly located away from the main body of the aircraft would provide the occupants with a greater chance of survival than if the main engine assembly was attached directly to the main body of the aircraft if the missile caused a fire at the main engine assembly. The additional engine assembly 15 and secondary rotor assembly could also be attached to the base of the tilt enabling joint, or the main engine assembly.

Figure 14:
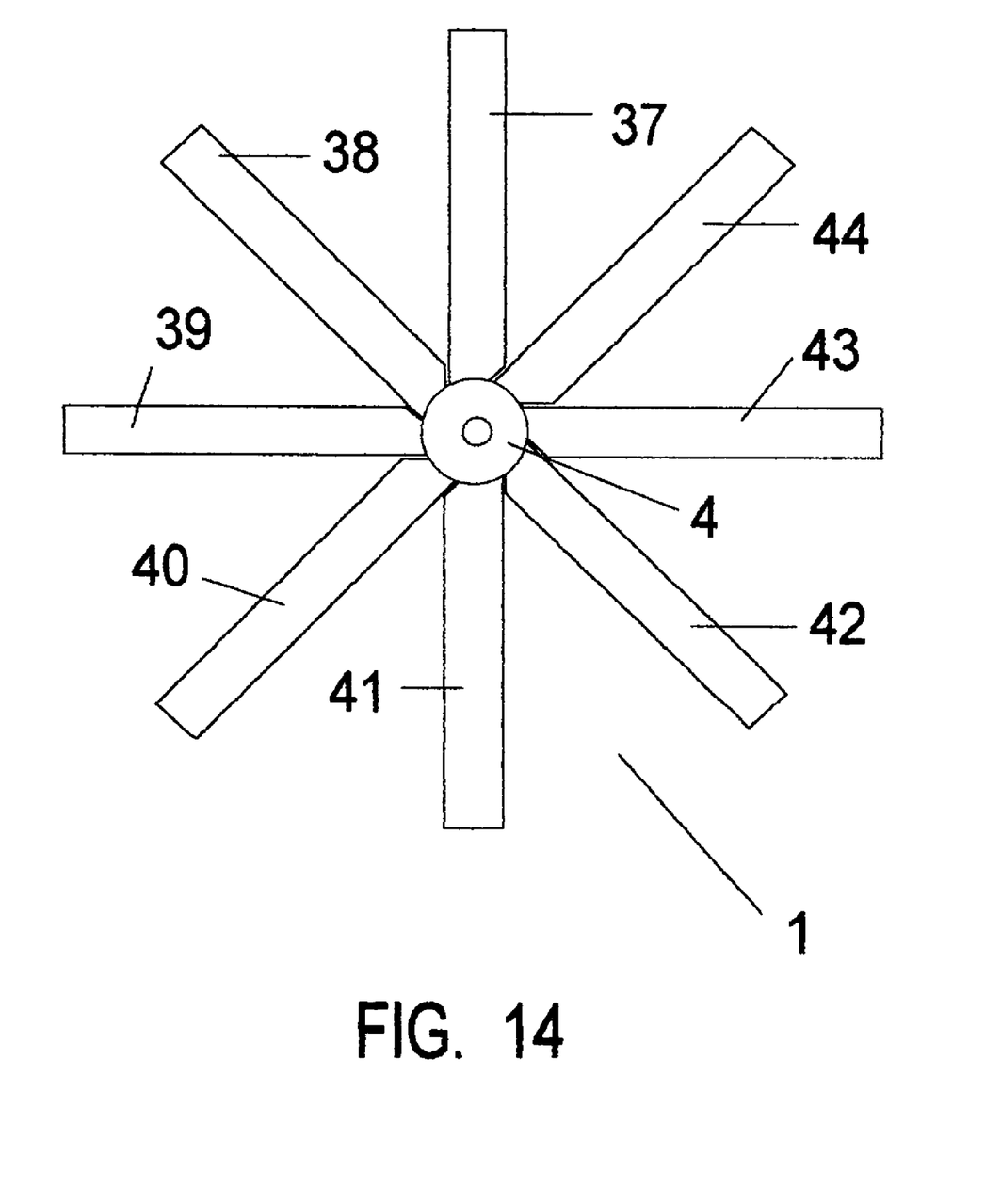
FIG. 14 shows that as many as eight rotor blades can be assembled around a small rotor hub when blade pitch varying components are not required.

FIG. 14 shows how eight rotor blades 37, 38, 39, 40, 41, 42, 43, 44, can be assembled around a rotor 4 when space is not required for blade pitch varying components. This number of rotor blades would allow the rotor assembly 1 to be rotated at a lower rate of revolution than a rotor assembly with fewer blades, to achieve the same lifting ability, resulting in a relatively quieter aircraft. Having a high number of rotor blades would help the aircraft to operate in high altitude mountainous regions or hot regions, where the air is thin.

The claims defining this invention are as follows:

1. A vertical take-off aircraft, comprising a main body, a main rotor assembly, a secondary rotor assembly, an engine assembly which is a main engine assembly, and an additional engine assembly, which said main rotor assembly is comprised of an assembly of blades and a rotor, and which main rotor assembly is above the main body of the aircraft, with the aircraft able to achieve vertical lift by means of the main engine assembly rotating the main rotor assembly thereby forcing air in a downward direction by way of the blades in the main rotor assembly, and which main engine assembly is connected to the main body of the aircraft by a tilt enabling joint such that the main rotor assembly is able to be rotated relative to the main engine assembly and such that the main rotor assembly and main engine assembly can be tilted together as a unity in a plurality of directions and angles relative to the main body of the aircraft, in a controlled manner, such that the direction of travel of the aircraft can be altered by altering the direction of tilt of the main engine assembly relative to the main body of the aircraft, and which said tilt enabling joint is connected to the main body of the aircraft, and which secondary rotor assembly comprises an assembly of blades and a rotor, which secondary rotor assembly is able to be rotated by means of the additional engine assembly, and which secondary rotor assembly is connected to the aircraft such that rotation of the secondary rotor assembly is able to force air to travel in a horizontal direction relative to the main body of the aircraft, such that by forcing air to travel in a horizontal direction, relative to the main body of the aircraft, a rotational force exerted on the main body of the aircraft by rotation of the main rotor assembly can be countered, and which additional engine assembly is connected to the aircraft such that tilting of the main engine assembly relative to the main body of the aircraft by the tilt enabling joint causes the additional engine assembly to move relative to the main body of the aircraft.

2. The aircraft of claim 1 wherein the additional engine assembly comprises only one engine.

3. The aircraft of claim 2 wherein the main engine assembly comprises only one engine.

4. The aircraft of claim 1 wherein the main engine assembly comprises only one engine.

* * * * *